(12) United States Patent
Schunk et al.

(10) Patent No.: US 8,330,451 B2
(45) Date of Patent: Dec. 11, 2012

(54) SENSOR FOR MEASURING ROTATIONAL SPEEDS AS WELL AS FOR THE SIMULTANEOUS DETERMINATION OF DIRECTION OF ROTATION

(75) Inventors: Matthias Schunk, Auerbach (DE); Matthias Trescher, Parkstein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 391 days.

(21) Appl. No.: 12/604,556

(22) Filed: Oct. 23, 2009

(65) Prior Publication Data

US 2010/0117628 A1    May 13, 2010

(30) Foreign Application Priority Data

Nov. 11, 2008  (DE) .................. 10 2008 056 700

(51) Int. Cl.
    *G01P 3/48*    (2006.01)
(52) U.S. Cl. .................. 324/166; 324/165; 324/173
(58) Field of Classification Search .................. 324/166, 324/173–174, 207.15–207.25
    See application file for complete search history.

(56) References Cited

U.S. PATENT DOCUMENTS

| 4,507,638 | A | * | 3/1985 | Brosh .................. 336/79 |
| 5,969,518 | A | | 10/1999 | Merklein et al. |
| 6,043,644 | A | | 3/2000 | de Coulon et al. |
| 6,611,138 | B2 | * | 8/2003 | Vasiloiu .................. 324/207.12 |
| 6,836,128 | B2 | | 12/2004 | Palata |
| 7,372,253 | B2 | | 5/2008 | Biber et al. |
| 2006/0104558 | A1 | | 5/2006 | Gallion et al. |
| 2006/0225358 | A1 | | 10/2006 | Haag et al. |
| 2009/0021243 | A1 | | 1/2009 | Schunk |

FOREIGN PATENT DOCUMENTS

| DE | 196 44 744 A1 | 5/1998 |
| DE | 101 30 572 A1 | 1/2003 |
| DE | 10 2005 029 764 A1 | 1/2007 |
| DE | 10 2007 033 745 A1 | 1/2009 |
| GB | 2 014 319 A | 8/1979 |

* cited by examiner

*Primary Examiner* — Jay Patidar
(74) *Attorney, Agent, or Firm* — Davis & Bujold, PLLC

(57) ABSTRACT

A measurement of a lower and a higher speed of rotation is taking place via the inductive sensor. A sensor unit, which comprises a pulse generator, a transmitter side and a receiver side, is used for determining the speed of rotation, whereby the transmitter side comprises a transmitter inductor connected with an oscillator, and the receiver side comprises two receiving inductors. The signal, which is generated by the two receiver inductors and transmitted along each of the signal paths, is forwarded to two signal processing units. Through each of the two signal paths, for lower and higher speed of rotation, the processed signal is forwarded to a logic device.

13 Claims, 2 Drawing Sheets

SENSOR FOR MEASURING ROTATIONAL SPEEDS AS WELL AS FOR THE SIMULTANEOUS DETERMINATION OF DIRECTION OF ROTATION

This application claims priority from German patent application serial no. 10 2008 056 700.0 filed Nov. 11, 2008.

FIELD OF THE INVENTION

The invention concerns a rotation sensor and its configuration, for measuring slower rotation speed, in the low rotation speed range, and fast rotation speed, in a fast rotation speed range, resulting in high measurement accuracy.

BACKGROUND OF THE INVENTION

As the state of the art, several different systems are being used to measure the speed of rotation. For instance, in DE 196 44 744 C2, the use of hall effect sensors is described. The advantages of these sensors are provided by availability at low cost, the use in a high temperature environment, and the highly accurate measurement of the speed of rotation.

In accordance with DE 10 2005 029 764 A1, an additional sensor element is represented by the MR (magnetoresistive) sensor which is suitable for registering the variations of a magnetic field. At the same rate as the above mentioned sensor units, inductive sensor elements are used for measuring the speed of rotation. They can be used as displacement sensors for determining a position of a piston, for instance known from DE 101 30 572 A1, as well as being used for measuring the speed of rotation of a part, being further explained in DE 10 2007 033 745.

As being state of the art, inductive displacement recognition comprises two or more inductors through which the calculation of the speed of rotation is accomplished by altering the frequency. In DE 101 30 572 A1, an oscillator with 8 or 16 inductors, respectively, which are connected with one or more multiplexers, a change over switch and a capacitor, the calculation is guaranteed as taking place through the frequency change in each inductor, avoiding any distortion of the measured signal. Based on the configuration in DE 101 30 572 A1, it is obvious to recognize that the parts of an inductive sensor represent a complex configuration which requires a larger effort in the circuit design for analyzing the frequency.

Another aspect of the state of the art is presented in a previous filing of DE 10 2007 033 745. Herein, the inductive sensor comprises a configuration of two inductors, both connected with oscillators and, due to their proximity to each other, are driven by a multiplexer in a way so that interaction is eliminated. The special configuration of the inductors allows a larger distance from a pulse wheel, as compared to other state of the art sensors. The larger the distance which can be realized between the pulse wheel and the inductor, preferably more than 5 to 10 mm, the easier it becomes to exchange the pulse wheel as part of the inductive sensor. However, it needs to insured that correct signals are received, despite the larger distance.

SUMMARY OF THE INVENTION

Therefore, the task is here to eliminate the problems of the current state of the art in a way so that an inductive sensor can equally measure low and high rotational speed, without compromising the accuracy and determining, at the same time, the direction of the rotation. An additional task of the invention is the space saving positioning of the inductive sensor and the pulse wheel, despite the large distance.

A signal, created by having a pulse wheel interact with a sensor unit, is present within the sensor unit at two receiving inductors. At this point, each signal, which may comprise a high speed of rotation or a low speed of rotation, is transferred in each case to two signal processing units, conditioning each signal separately from another in two modes, followed by the transfer to a logic device.

The advantage of the sensor unit, in accordance with the invention, is the fact that one and the same unit can be applied for the measurement of low speed of rotation as well as with high speed of rotation. Thereby, the signal processing or frequency analysis, respectively, takes place by applying two models.

The device, in accordance with the invention, includes four different components, each different in their functionality: the pulse generator, the sensor unit, the signal processing unit and the logic device.

It is the task of the pulse generator to periodically triggering the sensor. The pulse generator, in accordance with the invention, is a part that is movable. Preferably, gear wheels are employed. Another possible embodiment of the pulse generator is achieved through a periodic grid structure.

The pulse generator creates the signals in the sensor unit. The creation of signals depends on the application of the inductors which generate, caused by the changing of their inductivity, changes in the voltages or frequencies, combined with the oscillator. In most cases, a sensor unit comprises a transmitter inductor and a receiver inductor. In this invention, the sensor unit is positioned in the area of the pulse wheel, comprises a transmitter inductor, an oscillator, and two receiver inductors, whereby the pulse wheel is positioned at a distance of approximately 5 mm. Thus, it is easy to exchange the pulse wheel. The transmitter inductor is connected to the oscillator, while the receiver inductors, configured as two planar inductors, are positioned, in the rotating direction, at an offset to each other. By activating of the pulse wheel, the inductance of the inductor changes, or the mutual inductance changes, again hereby cause a change of the signal amplitude.

The necessity of having two receiver inductors is a result of requiring a redundancy of a signal to begin with but also, due to having two receiver inductors, the pulse wheel rotating direction is determined without any coding of the pulse wheel being necessary. In addition, the receiver inductors, being at an offset to each other, offer a large effective inductor area. The receiver inductors, in accordance with this invention, are bent from wire or stamped parts, or are edged into a printed circuit board. This relates to a multi layer technology.

Following the creation of a signal in the sensor unit, processing is required. Sensor units, known in the industry, always work within a predetermined range of speed rotation, whereby threshold parameters are in existence to which the signal is compared to. Depending on whether the threshold values are exceeded or they fall short, the signal is processed further. Since the unit, according to the invention, processes the signal by two different methods, and the signal is induced simultaneously by two inductors, the unit comprises a total of four signal processing sections. Two of each work in the same mode so that matching of the signals can take place.

After filtering of the signal in the signal processing unit, it is sent to a component which is finally responsible for forwarding one of the applicable signals, becoming an output signal, to an interface. In this present invention, this component is designated as a logic device comprising a microcontroller, an ASIC with an integrated DSP, or a Gate Array.

During this step, by comparing the two signals, it is determined which signal is forwarded, as an output parameter, to the interface.

BRIEF DESCRIPTION OF THE DRAWINGS

A preferred embodiment of this invention is presented as an example in two drawings. Being shown is.

DETAILED DESCRIPTION OF THE PREFERRED EMBODIMENTS

Figure 1:
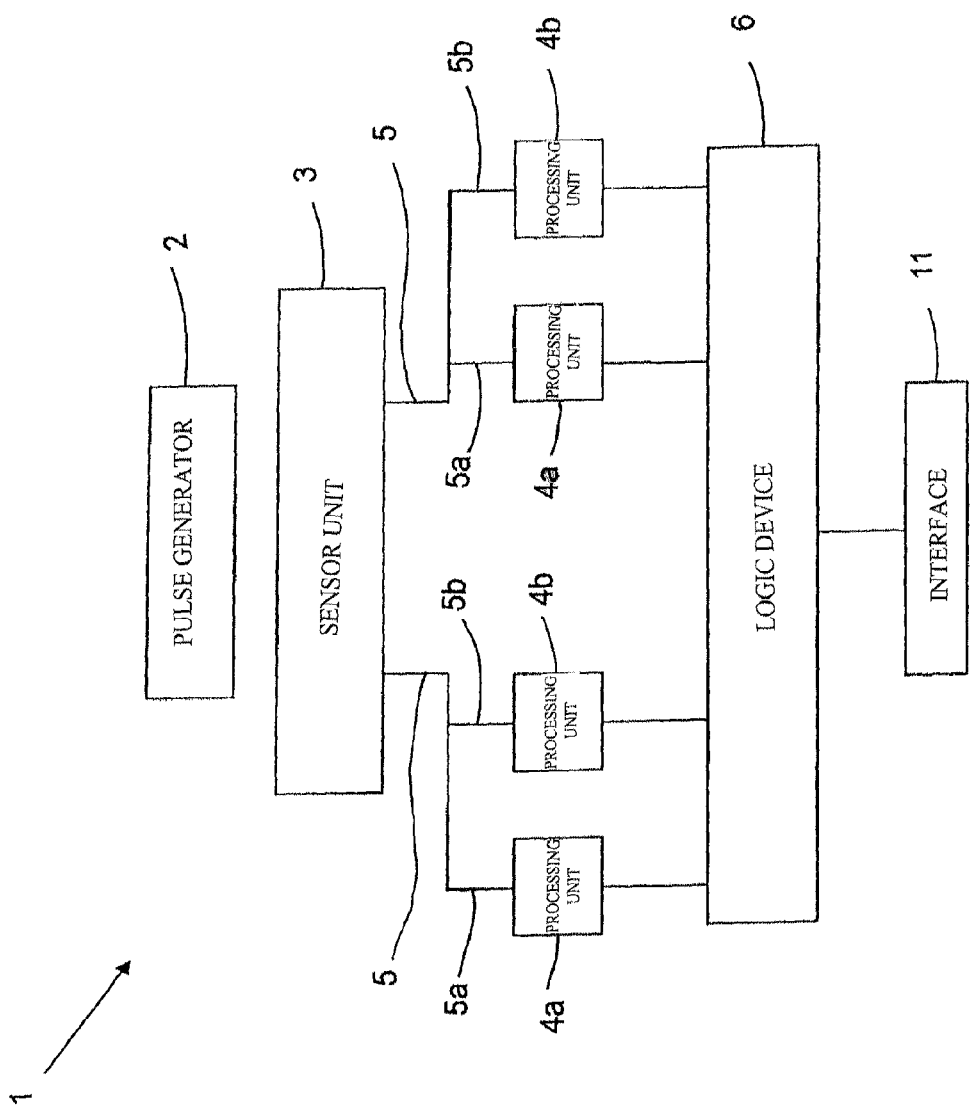
FIG. 1: a schematic illustration of an inductive sensor.

FIG. 1 shows an inductive sensor 1. The generation of an output signal starts with the pulse generator 2 which is positioned in the area of the sensor unit 3, and is further described in FIG. 2. While there is no existing cable connection between the pulse generator 2 and the contactless sensor unit 3, two signal paths 5 exit from the sensor unit 3. The two signal paths forward the signals of two receiver inductors 8 and 9. Prior to establishing in the signal paths 5, the signal processing of 4a, 4b, for low speed of rotation 4a, and for high speed of rotation 4b, the signal paths are each split so that the two signals, exiting from the sensor unit 3, after branching into four signal paths, whereby two signal paths are present for a low speed of rotation 5a, and two signal paths are present for a high speed of rotation 5b, are forwarded to the respective signal processing for the low speed of rotation 4a and the high speed of rotation 4b. After the signals have undergone the four signal processing stages, two for each receiver inductor, they are forwarded to a logic device 6 as four signal paths. The logic device 6 then decides, based on the received and processed signals, which signal is finally forwarded to the interface 11.

Figure 2:
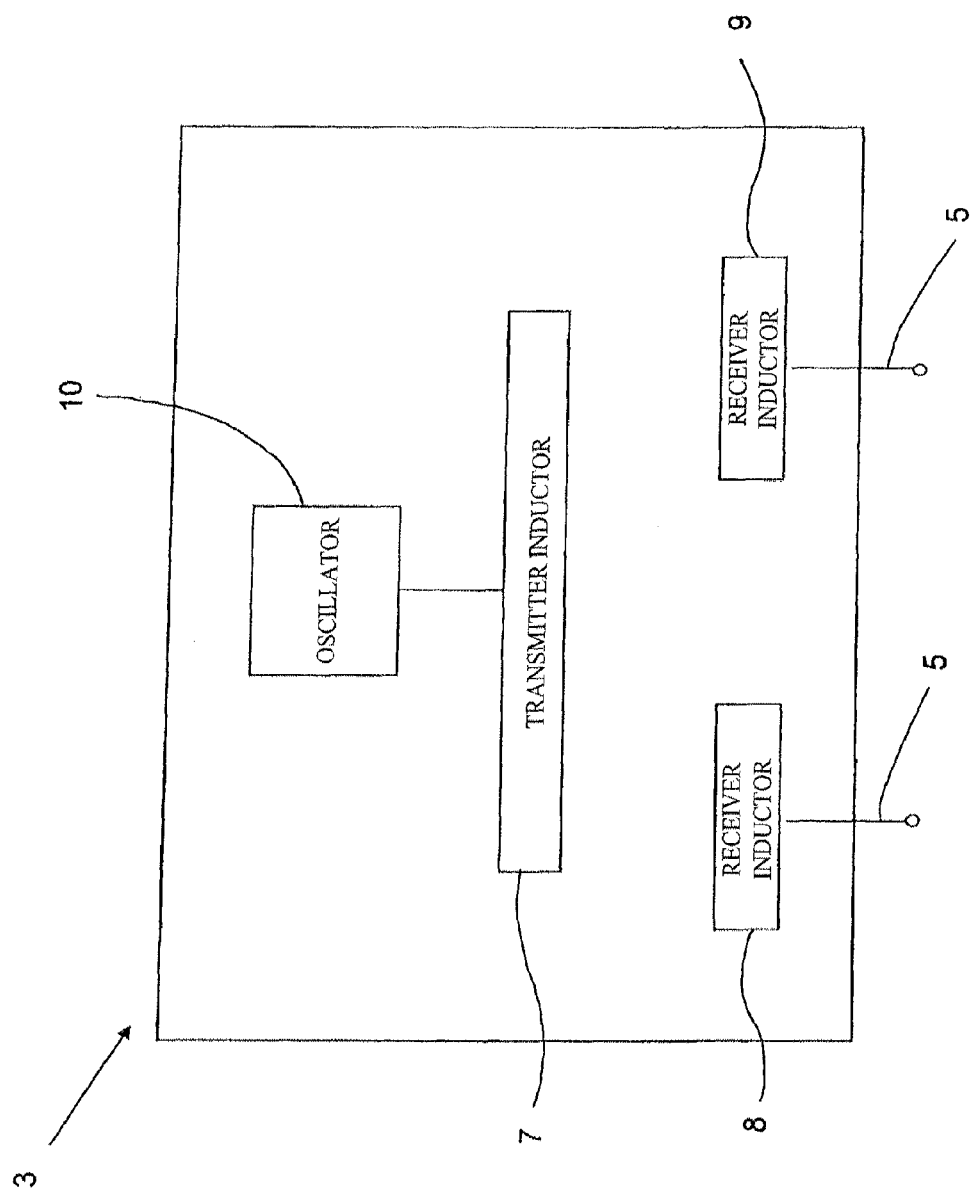
FIG. 2: a schematic illustration of a sensor unit.

FIG. 2 shows the presented sensor unit 3 in more detail. The sensor unit 3 comprises of a transmitter inductor 7 and two receiver inductors 8, 9. Hereby, the transmitter inductor 7 is connected to an oscillator 10, which feeds an oscillator frequency into the transmitter inductor 3. For instance, the oscillator 10 can be a crystal oscillator which supplies the entire electronic circuit with a (carrier-) frequency. The two receiver inductors 8, 9 are installed, near the transmitter inductor 3, which are positioned in the running direction of the pulse generator 2, and have an offset to one another.

The inductors 7, 8, and 9 are recognized as transformers or transducers, because the transmitter inductor 7 and the receiver inductor 8 are coupled by a magnetic field. The carrier frequency of the oscillator 10 is transmitted to the receiver inductor 8, or also 9 and has a signal strength or amplitude. The pulse generator 2 is a gear wheel and the magnetic coupling is influenced by each passing tooth of the gear wheel. A relating amplitude modulation, in a carrier frequency envelope, is monitored in the receiver inductor 8: the higher the rotation speed of the pulse generator 2, the more often dips occur in the signal envelope. This variable modulation frequency is lower than the fixed carrier frequency. The receiver inductor 9 shows the same effects.

The signal paths 5 originate at the location where the two receiver inductors 8, 9 are installed within the sensor unit 3, which then forward the signal to the four signal processing units 4a, 4b, as described in FIG. 1.

REFERENCE CHARACTERS

1 Pressure Sensor (handwritten) Rotation Speed Sensor
2 Pulse Generator
3 Sensor Unit
4a Signal Processing for low rotation speed
4b Signal Processing for high rotation speed
5 Signal Path of Receiver Inductor
5a Signal Path for low rotation speed
5b Signal Path for high rotation speed
6 Logic Device
7 Transmitter Inductor
8 Receiver Inductor I
9 Receiver Inductor II
10 Oscillator
11 Interface

The invention claimed is:

1. An inductive sensor system (1) for measuring low range rotational speeds and high range rotational speeds, the inductive sensor system comprising:
   a sensor unit (3) having a transmitter inductor (7) and receiver for transmitting rotational speed signals,
   a pulse generator (2) being positioned adjacent the sensor unit (3),
   the transmitter inductor (7) being connected with an oscillator (10), and
   the receiver comprising two receiver inductors (8, 9), each of the two receiver inductors (8, 9) forwarding the rotational speed signals, via a respective first signal path (5a), to a respective low rotational speed processing unit (4a) and, via a second signal path (5b), to a respective high rotational speed processing unit (4b);
   a logic device (6) communicating with and receiving processed rotational speed signals from both of the low rotational speed processing units (4a) and both of the high rotational speed processing units (4b), the logic device (6) forwarding an output parameter to an interface (11).

2. The inductive sensor system according to claim 1, wherein the two receiver inductors (8, 9) are offset from each other in a direction of rotation of the pulse generator to determine the direction of rotation.

3. The inductive sensor system according to claim 1, wherein the two receiver inductors (8, 9) are planar inductors and are spatially offset from each other in the direction of the rotation of the pulse generator.

4. The inductive sensor system according to claim 1, wherein the pulse generator (2) is a gear wheel.

5. The inductive sensor system according to claim 1, wherein the logic device (6) is one of a microcontroller, an ASIC with an integrated DSP, and a gate array.

6. The inductive sensor system according to claim 1, wherein the logic device (6) calculates the output parameter from the received processed rotational speed signals, and compares the output parameter with a threshold value.

7. The inductive sensor system according to claim 1, wherein a distance of the sensor unit (3) from the pulse generator (2) is between 0 and 10 mm.

8. The inductive sensor system according to claim 1, wherein the pulse generator (2) is removably connected to the inductor sensor system.

9. The inductive sensor system according to claim 1, wherein the pulse generator (2) is not a magnetic actuator.

10. The inductive sensor system according to claim 1, whereby the pulse generator (2) periodic lattice structure.

11. The inductive sensor system according to claim 1, wherein the receiving inductors (8, 9) are arranged in a printed multilayer circuit board.

12. The inductive sensor system according to claim 1, wherein the receiver inductors (8, 9) are either stamped parts or bent from wire.

13. An inductive sensor system (1) for measuring low and high range rotational speeds, the inductive sensor system comprising:

a pulse generator (2), which generates rotational speed signals, being positioned adjacent a sensor unit (3);

the sensor unit (3) having a transmitter inductor (7) that is connected with an oscillator (10) and first and second receiver inductors (8, 9), the first inductor (8) communicating with a first low rotational speed processing unit (4*a*) and a first high rotational speed processing unit (4*b*), the second inductor (9) communicating with a second low rotational speed processing unit (4*a*) and a second high rotational speed processing unit (4*b*);

a logic device (6) directly communicating with each of the first and the second low rotational speed processing units (4*a*) and each of the first and the second high rotational speed processing units (4*b*);

each of the first and the second low rotational speed processing units (4*a*) and each of the first and the second high rotational speed processing units (4*b*) defining a distinct signal path (5*a*, 5*b*) between the first and the second receiver inductors (8, 9) and the logic device (6) such that the logic device (6) having a single output comprises four inputs.

* * * * *